United States Patent [19]
Fujita et al.

[11] Patent Number: 5,390,018
[45] Date of Patent: Feb. 14, 1995

[54] OPTICAL PULSE TESTER CAPABLE OF DISPLAYING RAMAN OR RAYLEIGH SCATTERED LIGHT

[75] Inventors: Tatsuyuki Fujita; Mikio Maeda, both of Tokyo; Toshiya Sato, Katsuta; Tsuneo Horiguchi, Mito, all of Japan

[73] Assignees: Ando Electric Co., Ltd.; Nippon Telegraph and Telephone Corporation, both of Tokyo, Japan

[21] Appl. No.: 213,578

[22] Filed: Mar. 16, 1994

[30] Foreign Application Priority Data

Mar. 17, 1993 [JP] Japan .................................. 5-057495

[51] Int. Cl.6 .......................................... G01N 21/88
[52] U.S. Cl. ................................................ 356/73.1
[58] Field of Search ........................................ 356/73.1

[56] References Cited

U.S. PATENT DOCUMENTS 5,323,224 6/1994 Wada ................................... 356/73.1

*Primary Examiner*—Vincent P. McGraw
*Attorney, Agent, or Firm*—Finnegan, Henderson, Farabow, Garrett & Dunner

[57] ABSTRACT

An optical pulse tester capable of displaying Raman scattered light is disclosed. An optical pulse with the specified wavelength is injected into an optical fiber to be measured via a directional coupler and an optical demultiplexer/multiplexer. The demultiplexer/multiplexer demultiplexes returning light from the optical fiber into Raman scattered light different from the optical pulse in wavelength. The directional coupler divides returning light from the optical fiber into Fresnel reflection light and Rayleigh scattered light with the specified wavelength. The switcher supplies the Rayleigh scattered light to a display In the case of long distance measurement or precise loss measurement of the optical fiber. Therefore, the display displays the characteristic waveform of the optical fiber with the Rayleigh scattered light. In contrast, the switcher supplies the Raman scattered light to the display in the case of the measurement of the near-end part of the optical fiber or the connecting point between optical fibers without a dead area. Therefore, the display displays the characteristic waveform of the optical fiber with the Raman scattered light.

1 Claim, 3 Drawing Sheets

OPTICAL PULSE TESTER CAPABLE OF DISPLAYING RAMAN OR RAYLEIGH SCATTERED LIGHT

BACKGROUND OF THE INVENTION

1. Field of the Invention

The present invention relates to optical pulse testers, and more particularly, to optical pulse testers which inject optical pulses into an optical fiber and demultiplexes returning light from the optical fiber into Raman scattered light, and which displays the Raman scattered light.

2. Background Art

An example of the structure of a conventional optical pulse tester will be explained with reference to FIG. 8. As shown in FIG. 3, an optical pulse generator 1, a directional coupler 2, a light receiver 8, an amplifier 4, a display 5, and an optical fiber 10, are provided. In FIG. 8, the optical pulse generator 1 emits optical pulse 11 with wavelength λa. The optical fiber 10 is to be measured and comprises an optical fiber 10B connected to an optical fiber 10A with an connector (not shown).

The optical pulse 11 with wavelength λa from the optical pulse generator 1 is injected into the optical fiber 10 via the directional coupler 2. The optical pulse 11 travels through the optical fiber 10 with the generation of Rayleigh scattered light 14 and Raman scattered light (not shown). Furthermore, Fresnel reflection light 18 is generated at the connecting point of the connector and the like. The parts of the scattered light generated in the optical fiber 10 return to an injected end of the optical fiber 10 as back-scattered light, that is, returning light 12. The returning light 12 from the optical fiber 10 is divided into the Fresnel scattered light 13 and the Rayleigh scattered light 14 in the directional coupler 2 and the Fresnel scattered light 13 and the Rayleigh scattered light 14 are received by the light receiver 3. The Fresnel scattered light 13 and the Rayleigh scattered light 14 in the returning light 12 are detected by the light receiver 3. The outpost light from the light receiver 3 is amplified by the amplifier 4. The output light from the amplifier 4 is displayed on the display 5.

Next, an example of the displayed waveform on the display 5 shown in FIG. 3 will be explained with reference to FIG. 4. FIG. 4 shows an example of the characteristic waveform of the optical fibers 10A and 10B in the case of connecting the optical fiber 10B to the optical fiber 10A with the connector. In FIG. 4, a vertical axis indicates loss of the optical fibers 10A and 10B and a horizontal axis indicates distance from the injected end of the optical fiber 10A. The vertical axis of FIG. 4, for example, indicates 40 dB with full scale. In FIG. 4, a peak 13A indicates the Fresnel reflection light 13 at the injected end of the optical fiber 10A. A straight line 14A indicates the Rayleigh scattered light 14 in the optical fiber 10A decreases exponentially with distance from the injected end of the optical fiber 10A (to the right of the horizontal axis in FIG. 4) and is logarithmically transformed. In FIG. 4, a peak 13B indicates the Fresnel reflection light 13 at the connecting point where the optical fiber 10B is connected to the optical fiber 10A. A straight line 14B indicates the Rayleigh scattered light 14 in the optical fiber 10B decreases exponentially with distance from the injected end of the optical fiber 10A and is logarithmically transformed. A peak 13C indicates the Fresnel reflection light 13 at an outgoing end of the optical fiber 10B. In FIG. 4, the right side area of the peak 13C indicates noise.

In FIG. 4, the Fresnel reflection light 13A, 13B, and 13C and the Rayleigh scattered light 14A and 14B have the same wavelengths as the optical pulse 11. Accordingly, when the Rayleigh scattered light 14A and 14B are measured, since the Fresnel reflection light is incomparably larger than the Rayleigh scattered light, the amplifier 4 shown in FIG. 3 may be supersaturated by the Fresnel reflection light 13A, 13B, and 13C. When the amplifier 4 becomes supersaturated by the Fresnel reflection light 13A, 13B, and 13C, a dead area is generated in the amplifier 4 until a circuit of the amplifier 4 becomes stable. In the dead area, the state of the optical fiber 10A and 10B are not clear for a constant time. In FIG. 4, numerical reference 21 and 22 indicate the dead area caused by the Fresnel reflection light 13A and 13B, respectively. In the part of the dead area 21 and 22, the state of the near-end part of the optical fiber 10A and 10B cannot be exactly measured. An optical switch operating at high speed may be inserted between the directional coupler 2 and the light receiver 3 shown in FIG. 3 so as not to inject the Fresnel reflection light 13 in the light receiver 3, so that it is possible not to supersaturate the input light in the amplifier 4. However, since the switching speed of the optical switch and the time corresponding to pulse width cannot be measured, the dead area cannot be eliminated. Accordingly, in the conventional art, a short pulse is used as the optical pulse 11 or the response speed of the circuit is improved so as to reduce the dead area.

SUMMARY OF THE INVENTION

In consideration of the above problems, it is an object of the present invention to provide an optical pulse tester capable of displaying Raman scattered light which is not influenced by Fresnel reflection light when the near-end of an optical fiber or the connecting point between optical fibers is measured.

To satisfy this object, the present invention provides an optical pulse tester capable of displaying Raman scattered light comprising: an optical pulse generator for generating an optical pulse with the specified wavelength; a directional coupler to which the optical pulse Is supplied, for dividing returning light from an optical fiber to be measured into Fresnel reflection light and Rayleigh scattered light with the specified wavelength; a demultiplexer/multiplexer to which the optical pulse via the directional coupler is supplied, for injecting an output light into the optical fiber and for demultiplexing returning light from the optical fiber into Raman scattered light different from the optical pulse in wavelength; a display for displaying a characteristic waveform of the optical fiber; and a switcher for supplying the Rayleigh scattered light to the display in the case of long distance measurement or precise loss measurement of the optical fiber, and for supplying the Raman scattered light to the display in the case of the measurement of the near-end part of the optical fiber or the connecting point between optical fibers without a dead area.

According to the present invention, a positive effect is that Rayleigh scattered light can be used in the case of long distance measurement and precise loss measurement of an optical fiber and Raman scattered light can be used in the case of the measurement of the near-end of an optical fiber or the connecting point between optical fibers without a dead area. Accordingly, influence by Fresnel reflection light can be reduced when the near-end of the optical fiber or the connecting point between the optical fibers is measured.

DETAILED DESCRIPTION OF THE PREFERRED EMBODIMENT

Figure 1:
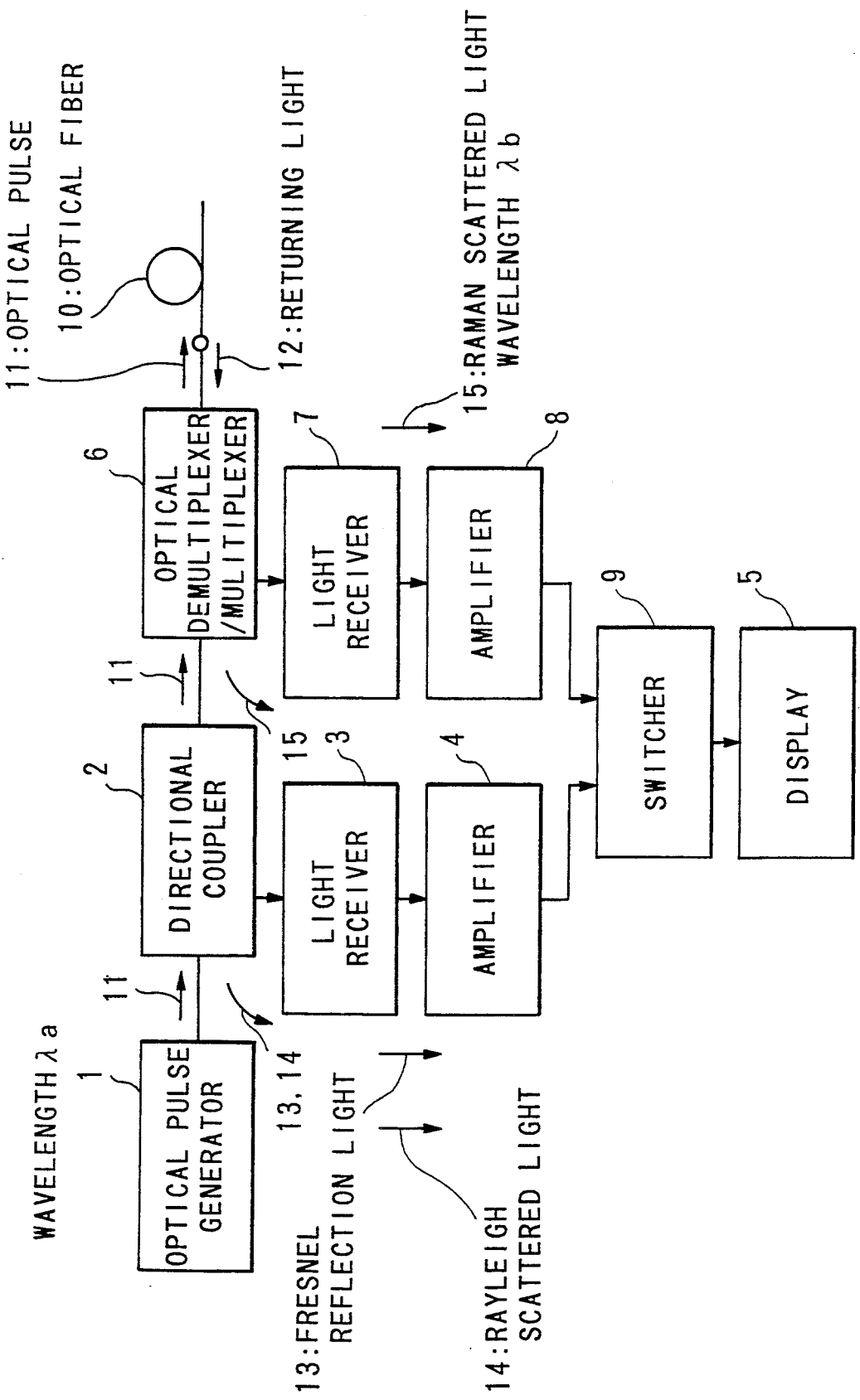
FIG. 1 shows a block diagram of the structure of an optical pulse tester based on the preferred embodiment of the present invention.
Figure 3:
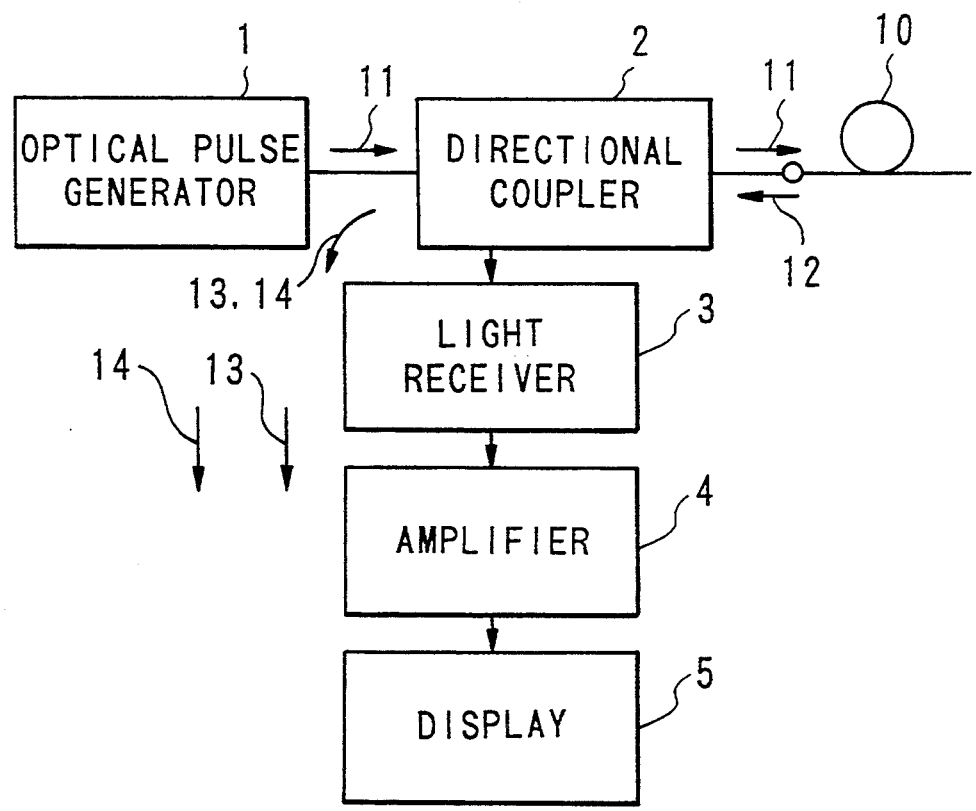
FIG. 3 shows an example of a block diagram of the structure of a conventional optical pulse tester.

Hereinafter, a preferred embodiment of the present invention will be explained with reference to the figures. FIG. 1 shows a block diagram of the structure of an optical pulse tester based on the preferred embodiment of the present invention. In FIG. 1, components which correspond to components in the conventional optical pulse tester shown in FIG. 3 will retain the original identifying numeral, and their description will not herein be repeated. In FIG. 1, an optical demultiplexer/multiplexer 6, a light receiver 7, an amplifier 8, and a switcher 9 are added to the conventional optical pulse tester shown in FIG. 3. The optical fiber 10 comprises the optical fiber 10B connected to the optical fiber 10A with the connector (not shown).

In FIG. 1, the optical pulse 11 with wavelength λa from the optical pulse generator 1 is injected Into the optical fiber 10 via the directional coupler 2 and the optical demultiplexer/multiplexer 6. In the optical fiber 10, the Rayleigh scattered light 14 with wavelength λa and the Raman scattered light 15 with wavelength λb are simultaneously generated. Furthermore, the Fresnel reflection light 13 is generated at the connecting point of the connector and the like. The parts of the scattered light generated in the optical fiber 10 return to the injected end of the optical fiber 10 as back-scattered light, that is, returning light 12.

The Fresnel reflection light 13 and the Rayleigh scattered light 14 have the same wavelength λa as the optical pulse 11. However, the wavelength λb of the Raman scattered light 15 is different from the wavelength λa of the optical pulse 11. For example, when the wavelength λa of the optical pulse 11 is 1.55 μm, the wavelength λb of the Raman scattered light 15 is 1.65 μm.

The level of the Raman scattered light 15 is lower by 2 or 3 orders of magnitude than one of the Fresnel reflection light 13 and the Rayleigh scattered light 14. The optical demultiplexer/multiplexer 6 is provided between the directional coupler 2 and the optical fiber 10, which demultiplexes the returning light 12 into the Raman scattered light 15 with wavelength λb and supplies the Raman scattered light 15 to the light receiver 7. By the wavelength-selecting characteristics of the demultiplexer/multiplexer 6, the Fresnel reflection light 13 is not injected in the light receiver 7. The Raman scattered light 15 with wavelength λb is detected by the light receiver 7. The output light from the light receiver 7 is amplified to the required level by the amplifier 8. The Fresnel reflection light 13 and the Rayleigh scattered light 14 with wavelength λa among the returning light 12 are divided in the directional coupler 2 and are received by the light receiver 3. The Fresnel scattered light 13 and the Rayleigh scattered light 14 are detected by the light receiver 3. The output light from the light receiver 3 is amplified to the required level by the amplifier 4. The switcher 9 selects either the Rayleigh scattered light 14 via the amplifier 4 or the Raman scattered light 15 via the amplifier 8 and delivers an output light. In the case of long distance measurement and precise loss measurement of the optical fiber 10, the switcher 9 selects an output light from the amplifier 4. In contrast, in the case of the measurement of the near-end part of the optical fiber 10 and the connecting point of the connector without a dead area, the switcher 9 selects an output light from the amplifier 8. An output light from the switcher 9 is supplied to the display 5.

Figure 2:
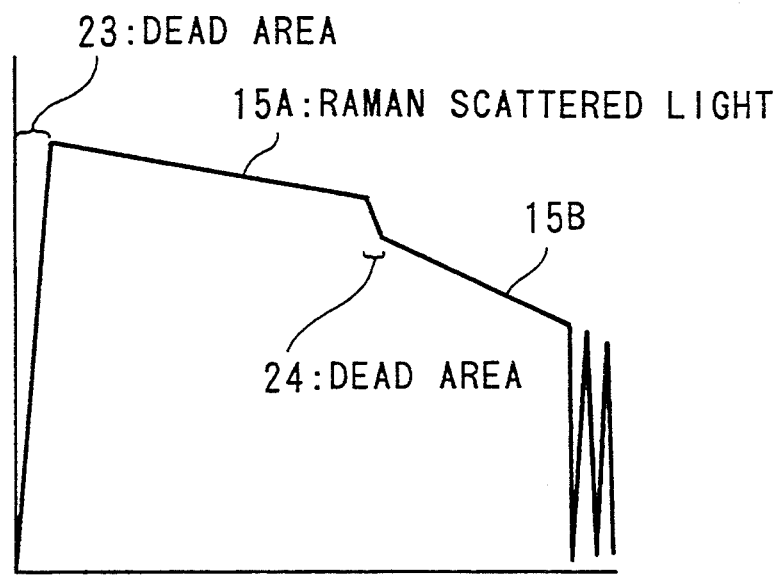
FIG. 2 shows an example of the waveform displayed on a display 5 shown in FIG. 1.

Next, an example of the displayed waveform on the display 5 shown in FIG. 1 will be explained with reference to FIG. 2. FIG. 2 shows an example of the loss characteristic waveform of the optical fiber 10 based on the Raman scattered light 15. In FIG. 2, a vertical axis, a horizontal axis and the structure of the optical fibers 10A and 10B are the same as FIG. 4. In FIG. 2., numerical reference 23 indicates a dead area corresponding to an optical pulse width at the injected end of the optical fiber 10A. A straight line 15A indicates the Raman scattered light 15 generated in the optical fiber 10A decreases exponentially with distance from the injected end of the optical fiber 10A (to the right of the time axis in FIG. 2) and is logarithmically transformed. In FIG. 2, numerical reference 24 indicates a dead area corresponding to an optical pulse width at a point where the optical fiber 10B is connected to the optical fiber 10A with the connector. A straight line 15B indicates the Raman scattered light 15 generated in the optical fiber 10B decreases exponentially with distance from the injected end of the optical fiber 10A and is logarithmically transformed. In FIG. 2, the right side area of the straight line 15B indicates noise at the outgoing end of the optical fiber 10B.

Figure 4:
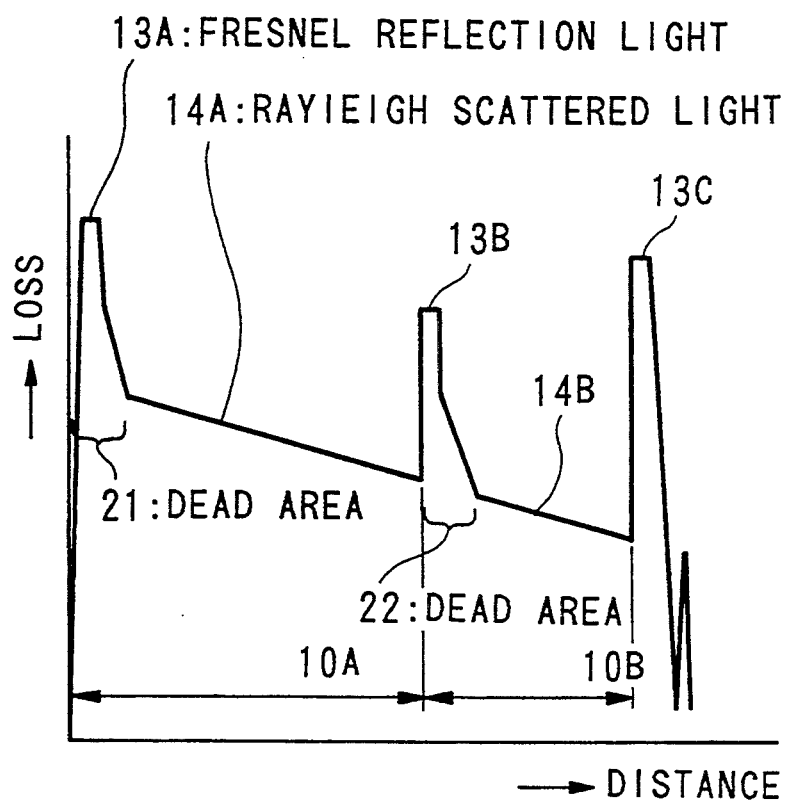
FIG. 4 shows an example of the waveform displayed on a display 5 shown in FIG. 3.

In a comparison of FIG. 2 with FIG. 4, the Fresnel reflection lights 13A, 13B, and 13C respectively shown in FIG. 4 are not drawn in FIG. 2. Since the Raman scattered light 15A and 15B are different From the Fresnel reflection light 13A, 13B, and 13C in wavelength, the Raman scattered light 15A and 15B are demultiplexed the returning light 12 into by the demultiplexer/multiplexer 6 shown in FIG. 1, but the Fresnel reflection light 13A, 13B, and 13C are not demultiplexed the returning light 12 into by the demultiplexer/multiplexer 6. In FIG. 2 which the Raman scattered light 15A and 15B are displayed, the Raman scattered light 15A and 15B are not influenced by the dead area 21 and 22 based on the Fresnel reflection light 13A, 13B, and 13C shown in FIG. 4.

What is claimed is:

1. An optical pulse tester capable of displaying Raman scattered light comprising:
   an optical pulse generator for generating an optical pulse with the specified wavelength;
   a directional coupler to which said optical pulse is supplied, for dividing returning light from an optical fiber to be measured into Fresnel reflection light and Rayleigh scattered light with said specified wavelength;
   a demultiplexer/multiplexer to which the optical pulse via said directional coupler is supplied, for injecting an output light into said optical fiber and for demultiplexing returning light from said optical fiber into Raman scattered light different from said optical pulse in wavelength;

a display for displaying a characteristic waveform of said optical fiber; and a switcher for supplying said Rayleigh scattered light to said display in the case of long distance measurement or precise loss measurement of said optical fiber, and for supplying said Raman scattered light to said display in the case of the measurement of the near-end part of said optical fiber or the connecting point between optical fibers without a dead area.

* * * * *